(No Model.)

A. D. SMITH.
NUT LOCK.

No. 591,892. Patented Oct. 19, 1897.

Witnesses
E. J. Nottingham
G. F. Downing

Inventor
A. D. Smith
By H. A. Seymour
Attorney

THE NORRIS PETERS CO., PHOTO-LITHO., WASHINGTON, D. C.

UNITED STATES PATENT OFFICE.

ALBERT D. SMITH, OF PHILADELPHIA, PENNSYLVANIA, ASSIGNOR OF ONE-HALF TO PAUL H. MARKLEY, OF HATBOROUGH, PENNSYLVANIA, AND HAMILTON MARKLEY, OF CAMDEN, NEW JERSEY.

NUT-LOCK.

SPECIFICATION forming part of Letters Patent No. 591,892, dated October 19, 1897.

Application filed June 29, 1897. Serial No. 642,845. (No model.)

*To all whom it may concern:*

Be it known that I, ALBERT D. SMITH, a resident of Philadelphia, in the county of Philadelphia and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to an improvement in nut-locks, and more particularly to that class of nut-locks which employ a spring-washer, the object of the invention being to provide a device that will be cheap to manufacture, very simple in construction, and strong, effectual, and durable when in operation.

With these objects in view the invention consists in certain novel features of construction and combinations and arrangements of parts, as will be more fully hereinafter described, and pointed out in the claims.

Figure 1:
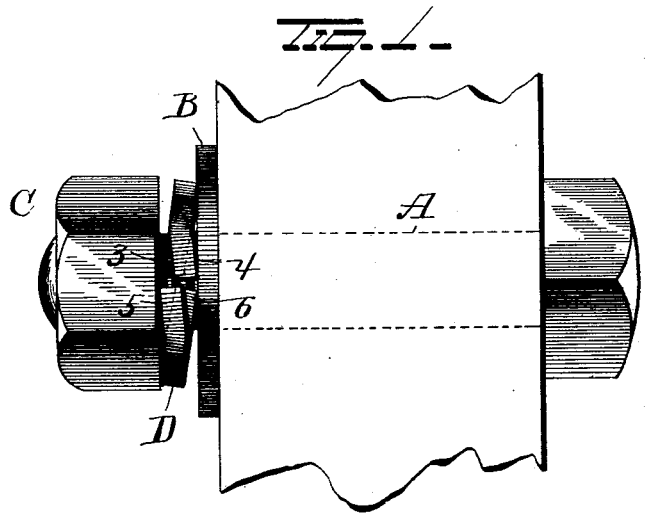
Figure 2:
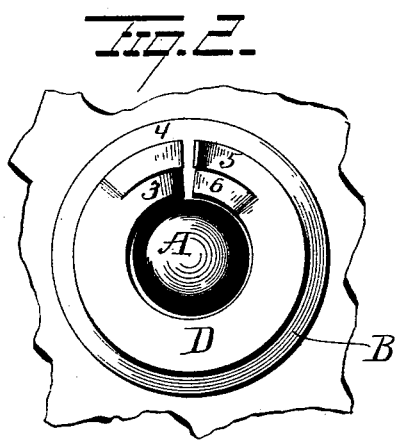
Figures 3, 4:
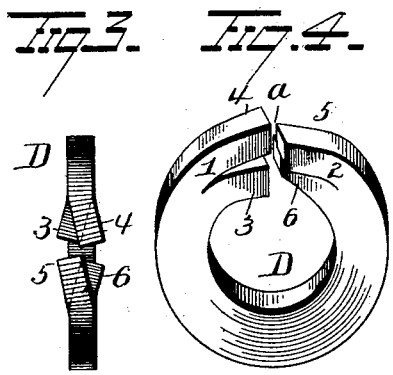

In the accompanying drawings, Figure 1 is a view showing my improved lock in position. Fig. 2 is a plan view of same, the nut being removed. Fig. 3 is an edge view, and Fig. 4 a perspective view, of the lock.

A represents a bolt of any ordinary construction, B a plate through which said bolt passes, and C a nut adapted to be secured upon the end of the bolt. Between the plate B and nut C my improved spring-washer D is placed. The washer is composed of spring metal, made flat upon its top and bottom faces and bent into circular form, the diameter of the inner edge of which is approximately the same as the diameter of the bolt A. The washer is cut or split as at *a* and the adjacent ends 1 2 are split any distance to form lugs or teeth 3 4 and 5 6, respectively. The diagonally opposite lugs or teeth 3 5 are bent laterally in one direction and the lugs or teeth 4 6 are bent laterally in the opposite direction, so that the ends of the teeth 3 5 will be disposed in one plane and the free ends of the teeth 4 6 in a different plane to one side of the planes of the respective faces of the washer. Thus it will be seen that when my improved washer is in position the arms or lugs 3 5 bear against and cut into the nut C, while the arms or lugs 4 6 bear against and cut into the plate B, or vice versa, as the case may be, as it will be understood that my improved washer may be placed on the bolt either side out and will operate with equal efficiency. It will be observed that my improved washer has four bearings, two against the nut and two against the plate B, and that the bearings of the teeth against the nut are diagonally opposite the bearings of the teeth against the said plate. In other words, one inner tooth 3 bears against the plate in close proximity to the bolt, while the opposite tooth 5 bears against the nut at a point close to the bolt, and the teeth 4 6 bear against the outer portions of adjacent faces of the nut and plate, respectively. By such construction, when the nut is screwed against the washer, the tendency will be to twist the same longitudinally and result in forcibly pressing the teeth against the adjacent faces of the nut and plate, so as to abrade or cut into the same and prevent any possibility of the slipping or unscrewing of the nut.

Slight changes might be made in the general form and arrangement of the several parts herein shown and described without departing from the spirit and scope of my invention, and hence I would have it understood that I do not limit myself to the precise details of construction herein shown and described; but, Having fully described my invention, what I claim as new, and desire to secure by Letters Patent, is—

1. In a nut-lock, an open ring having both ends split at points between its edges to form teeth, the respective teeth at each end being bent laterally in opposite directions, whereby the inner teeth will be made to bear against a nut and plate in close proximity to the bolt and the outer teeth against the nut and plate a distance from said bolt, substantially as set forth.

2. In a nut-lock the combination with a bolt, of a plate through which said bolt passes, a spring-washer having both of its ends split, adapted to be inserted on said bolt between the plate and a nut, substantially as set forth.

3. In a nut-lock the combination with a bolt, a nut and a plate, of a spring-washer having its ends split to form two arms or teeth at each end, each diagonally opposite arm or tooth bent laterally into the same plane, substantially as set forth.

4. In a nut-lock, the combination with a bolt, a plate through which said bolt passes and a nut, of a spring-washer composed of a single piece of spring metal, the ends of said washer being split or cut to form two arms or teeth at each end, the diagonally opposite arms or teeth of each end bearing respectively against the plate and nut and at different distances from the bolt, substantially as set forth.

5. As a new article of manufacture, a spring-washer composed of a single piece of spring metal and made into the form of an open ring having flat top and bottom faces, each end of said washer being split or cut to form two arms or teeth bent in laterally opposite directions the diagonally opposite arms or teeth on the respective ends adapted to bear against the plate and nut at different distances from the bolt, substantially as set forth.

In testimony whereof I have signed this specification in the presence of two subscribing witnesses.

ALBERT D. SMITH.

Witnesses:
ALFRED J. BRIGGS,
S. Z. TRIMBLE.